US008699080B2

(12) United States Patent
Chen et al.

(10) Patent No.: US 8,699,080 B2
(45) Date of Patent: Apr. 15, 2014

(54) METHOD AND APPARATUS FOR GENERATING MULTI-SITE FM SCREEN DOTS SIMULTANEOUSLY

(75) Inventors: Feng Chen, Beijing (CN); Zhihong Liu, Beijing (CN); Xiaohui Wen, Beijing (CN); Wei Zhu, Beijing (CN)

(73) Assignees: Peking University Founder Group Co., Ltd., Beijing (CN); Peking University, Beijing (CN); Beijing Founder Electronics Co., Ltd., Beijing (CN)

( * ) Notice: Subject to any disclaimer, the term of this patent is extended or adjusted under 35 U.S.C. 154(b) by 972 days.

(21) Appl. No.: 12/441,252

(22) PCT Filed: Sep. 17, 2007

(86) PCT No.: PCT/CN2007/002729
§ 371 (c)(1),
(2), (4) Date: Jun. 17, 2010

(87) PCT Pub. No.: WO2008/040162
PCT Pub. Date: Apr. 10, 2008

(65) Prior Publication Data
US 2010/0277769 A1     Nov. 4, 2010

(51) Int. Cl.
*G06K 15/00*      (2006.01)

(52) U.S. Cl.
USPC ........................................ 358/3.03

(58) Field of Classification Search
None
See application file for complete search history.

(56) References Cited

U.S. PATENT DOCUMENTS

| 4,955,065 | A |   | 9/1990  | Ulichney |
| 5,271,070 | A |   | 12/1993 | Truong et al. |
| 5,615,021 | A |   | 3/1997  | Lin |
| 2002/0003632 | A1 | * | 1/2002 | Nakano et al. .............. 358/1.9 |
| 2003/0112468 | A1 |   | 6/2003 | Eschbach et al. |
| 2003/0210210 | A1 | * | 11/2003 | Ide et al. ..................... 345/30 |
| 2005/0094211 | A1 |   | 5/2005 | Dang |
| 2005/0122545 | A1 |   | 6/2005 | Ranganathan et al. |
| 2006/0158693 | A1 | * | 7/2006 | Takahashi et al. ........... 358/3.03 |

FOREIGN PATENT DOCUMENTS

| EP | 0 602 854 B1 | 6/1994 |
| EP | 0 625 844    | 11/1994 |
| EP | 0 855 831    | 7/1998 |
| JP | 11-146202    | 5/1999 |

(Continued)

OTHER PUBLICATIONS

Supplementary European Search Report for European Patent Application No. 07816346.6 mailed May 22, 2012.

(Continued)

*Primary Examiner* — Jeremiah Bryar
(74) *Attorney, Agent, or Firm* — Finnegan, Henderson, Farabow, Garrett & Dunner, LLP

(57) ABSTRACT

The present invention relates to a method and an apparatus for generating multi-site FM screen dots simultaneously. The method according to the present invention can simultaneously process multiple neighboring pixels in the same row each time and generate multi-site screen dots; and meanwhile the method according to the present invention can renew simultaneously the error accumulation values of multiple locations of error row memory. The apparatus according to the present invention consists of an error row memory, an error row memory control circuit, an error allocation/accumulation register file, an error allocation/accumulation register file control circuit, and a screen dots generating circuit. The method and the apparatus according to the present invention can greatly improve the generating speed of FM screen dots, and only one read-write operation of the error row memory is needed during processing the multiple neighboring pixels each time.

15 Claims, 9 Drawing Sheets

(56) References Cited

FOREIGN PATENT DOCUMENTS

| JP | 2001-169109 | 6/2001 |
| JP | 2001-236249 | 8/2001 |
| JP | 2001-358942 | 12/2001 |
| JP | 2006-229928 | 8/2006 |
| JP | 2008-523739 | 7/2008 |
| KR | 2003-0000031 | 1/2003 |

OTHER PUBLICATIONS

Notification of Reason for Refusal for Japanese Patent Application No. 2009-527680 dated Feb. 2, 2012.

International Search Report from P.R. China in International Application No. PCT/CN2007/002729 mailed Dec. 27, 2007.

* cited by examiner

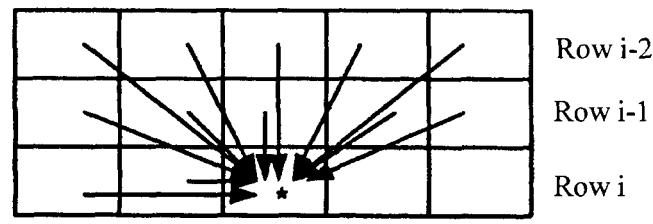
Fig. 1A    Fig. 1B
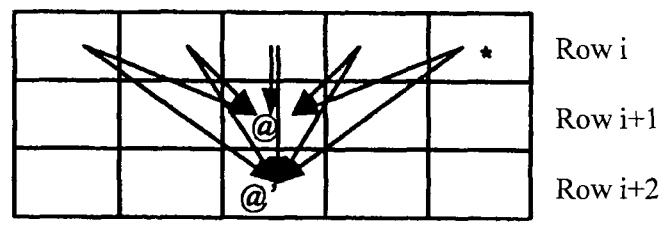
Fig. 1C
Fig. 1D

| (i, 1) (i, 2) | (i, 3) (i, 4) | (i, 5) (i, 6) | (i, 7) (i, 8) |
|---|---|---|---|
| (i+1, 1) (i+1, 2) | (i+1, 3) (i+1, 4) | (i+1, 5) (i+1, 6) | (i+1, 7) (i+1, 8) |
Fig. 7A
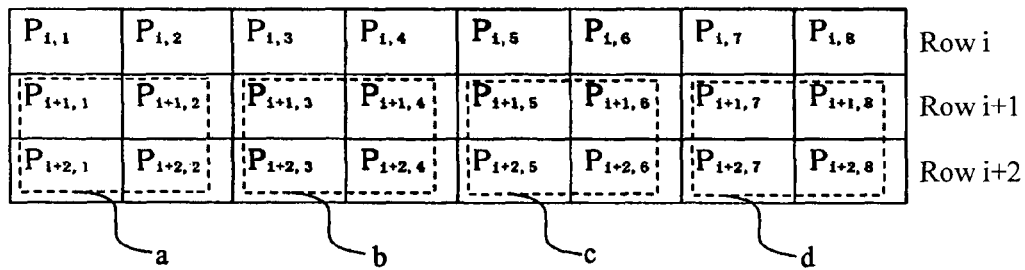
Fig. 7B
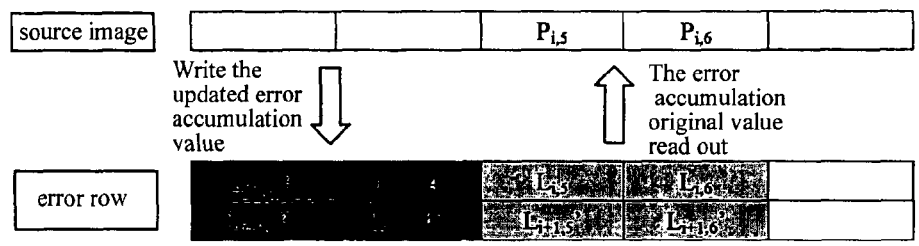
Fig. 8

| Column 1 | Column 2 |
|---|---|
| $E_{i,3}\ D_1$ | $E_{i,1}\ D_1$ |
| $E_{i,3}\ D_2$ | $E_{i,1}\ D_2$ |
| $E_{i,3}\ D_3$ | $E_{i,1}\ D_3$ |
| $E_{i,3}\ D_4$ | $E_{i,1}\ D_4$ |
| $E_{i,4}\ D_1$ | $E_{i,2}\ D_1$ |
| $E_{i,4}\ D_2$ | $E_{i,2}\ D_2$ |
| $E_{i,4}\ D_3$ | $E_{i,2}\ D_3$ |
| $E_{i,4}\ D_4$ | $E_{i,2}\ D_4$ |
| $L_{i+1}',\ 3$ | |
| $L_{i+1}',\ 4$ | |

METHOD AND APPARATUS FOR GENERATING MULTI-SITE FM SCREEN DOTS SIMULTANEOUSLY

TECHNICAL FIELD

This invention relates to screen dots generating method and apparatus in the field of digital image half toning, and more particular to a method and an apparatus for generating multi-site frequency-modulation (FM) screen dots simultaneously.

BACKGROUND

Error diffusion is the most commonly used FM screening method. According to this method, when the gray levels of each pixel point of a source image are compared with a threshold to generate screen dots, the errors between the gray levels of the pixel points and the threshold are diffused to pixel points around the pixel point. For example, for a image with 256 gray level, the threshold is 127, the gray level of a certain pixel point is 150, and upon comparison, the pixel point should be recorded as a white screen dot (the gray level of a white screen dot is 255), while actually this pixel point is not really white and has an error value of 105 with the real white color, and then the error of 105 is diffused to the pixel points around this pixel point in a certain method. Common error diffusing methods are Floyd-Steinberg algorithm, and Jarvis algorithm.

Floyd-Steinberg algorithm refers to allocating the error of one pixel to four pixel points surrounding it. That is, 7/16 of the error is added to the first pixel point in the right of the current pixel point, 5/16 of the error is added to the pixel point in the next row over against the current pixel point, 3/16 of the error is added to the neighboring pixel point in the left of the pixel point in the next row over against the current pixel point, and 1/16 of the error is added to the neighboring pixel point in the right of the pixel point in the next row over against the current pixel point. This process is performed repeatedly, and the same correction of the gray levels and the half toning are performed to each pixel point in the image.

Jarvis algorithm is to allocate the error of a current pixel X to 12 neighboring pixels, as shown in FIG. 1A. The error allocation ratios of some locations among the 12 locations are the same, so only 4 different error allocation ratios are needed, wherein the error of the current pixel X can be allocated in the ratios of $D_1=1/48$, $D_2=3/48$, $D_3=5/48$, and $D_4=7/48$. Although the image half toning processing based on Jarvis error diffusing method can achieve better effect by expanding the scope of error diffusion, the error diffusion according to this method relates to more row and more pixel points, which leads to increasing the storage capacity and slowing the speed, therefore it cannot meet real-time demands and then the application field is limited.

In addition, during error diffusion using the above-mentioned algorithm, if the source image is always only processed via single-direction scanning, the error of each scanned row would be simply added to the next row, which leads to error accumulation that is represented by a driving tendency of the image in the output pattern. Hence, during scanning, a 'S' shaped scanning is usually adopted, i.e. scanning from let to right for odd number rows, as shown in FIG. 1A; and scanning from right to left for even number rows, as shown in FIG. 1B (or on the contrary). Scanning is repeated in this manner till the last row.

China patent application No. CN 200510063255.3 discloses a method for generating FM screen dots at high speed (published on Sep. 14, 2005), and this method lowers the operation times of memory while can only process image pixel by pixel, and also, this method cannot process multiple pixels and generate multiple screen dots simultaneously.

US patent application entitled "Multi-dimensional error diffusion technique" (U.S. Pat. No. 5,271,070) discloses a parallel processing method for error diffusion. Although this method can process a plurality of pixel points, it needs to perform multiple read/write operations on the memory, and the 'S' shaped image scanning cannot be performed on the source image, which affects the generating speed of the screen dots, which is unhelpful to eliminate the driving effect resulting from the error accumulation.

SUMMARY

In view of the defects in the prior art, this invention provides a method for generating multi-site FM screen dots simultaneously, including the following steps: initializing an error row memory which is configured to store a final error accumulation value and an intermediate error accumulation value of pixel points; initializing an error allocation/accumulation register file; acquiring the original gray levels of N neighboring source pixels in each group row by row and group by group, and generating N-site screen dots according to the values stored in the error row memory and the error allocation/accumulation register file, wherein N≥2; and updating the values in the error row memory and the error allocation/accumulation register file each time when the N neighboring pixels in one group are processed.

This invention further provides a apparatus for generating multi-site FM screen dots simultaneously, including: an error row memory and an error row memory control circuit connected therewith; an error allocation/accumulation register file and an error allocation/accumulation register file control circuit connected therewith; a plurality of screen dots generating circuit, each of which consists of a gray generating circuit and a threshold comparing circuit and an error generating circuit respectively connected to the output end therein, and is configured to generate the final screen dots of one pixel and the error allocation value of this pixel to surrounding pixels; wherein the output end of the error generating circuit in each of said screen dots generating circuits is connected with the input end of the gray generating circuit among said multiple screen dots generating circuits in the following screen dots generating circuit, and is connected with the input ends of the error row memory control circuit and the error allocation/accumulation register file control circuit; and wherein the output ends of the error row memory control circuit and the error allocation/accumulation register file control circuit are connected to the input ends of the gray generating circuits in each the screen dots generating circuits.

The method and the apparatus according to the present invention can process a plurality of neighboring pixel points in the same row, generate multi-site screen dots, and can achieve updating a plurality of error accumulation value in the error row memory only through one read operation and one write operation, which greatly reduces the times of reading and writing the memory and improves the generating speed of the FM screen dots.

BRIEF DESCRIPTION OF DRAWINGS

FIG. 1A is a schematic view of the error diffusion principle of the pixel X in an odd number row on the basis of Jarvis algorithm during 'S' shaped scanning;

FIG. 1B is a schematic view of the error diffusion principle of the pixel X in an even number row on the basis of Jarvis algorithm during 'S' shaped scanning;

FIG. 1C and FIG. 1D are schematic views of error diffusion allocation based on Jarvis algorithm;

FIG. 7A is a schematic view of an error row memory with an image width of 8 pixels in the high speed FM screen dots generating apparatus which processes two neighboring pixels in the same row based on Jarvis algorithm according to one embodiment of this invention;

FIG. 7B is a schematic view of part of the pixel points in certain three neighboring rows of the processed image;

FIG. 8 is a schematic view of the process of reading and writing the error row memory in the apparatus as shown in FIG. 2;

DETAILED DESCRIPTION

Figure 2:
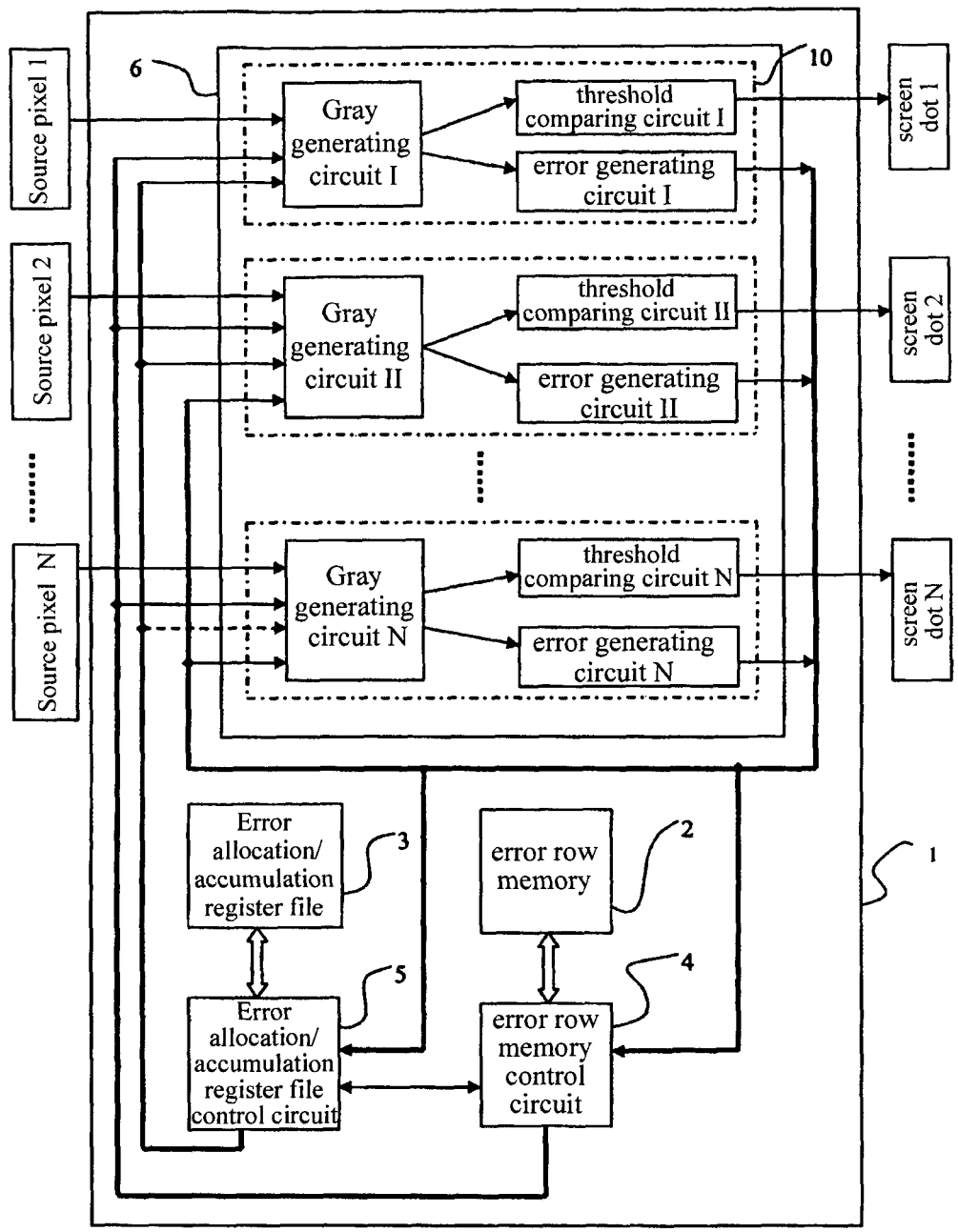
FIG. 2 is a block diagram of the high speed FM screen dots generating apparatus which processes multiple neighboring pixels in the same row according to one embodiment of this invention.

This invention will be further detailed hereinafter in conjunction with the drawings of the Description and the embodiment thereof.

The basic principle and the apparatus adopted of the error diffusion method according to this invention will be firstly described in brief.

During error diffusion, each point has error diffusion to its surrounding points. Correspondingly, for a currently processed point, it will also be affected by the error diffusion of surrounding points. Hence, all the points that would affect the current pixel point should be processed in order to process the current pixel point.

Taking Floyd-Steinberg algorithm as an example, as the error of one pixel point is diffused to its 4 surrounding points, so a rule can be easily obtained, that is, any pixel point is only affected by the error diffusion of its 4 surrounding points. That is to say, suppose one image consists of pixel points arranged in n rows and m columns, in which i refers to the row number, j refers to the column number (which refer to the same meanings hereinafter), then after processing the pixel point $P_{i-1,j+1}$ in row i-1, the error diffusion of all the pixel points in row i-1 converged at pixel point $P_{i,j}$ can be calculated. Hence, before the remaining points in row i-1 haven't been all processed, a memory is needed to store the error accumulation values of the points in row i-1 with respect to pixel point $P_{i,j}$, so that they can be extracted and for calculating the screen dots value of $P_{i,j}$ and the error diffusion of pixel point $P_{i,j}$ to surrounding pixels when processing the points in row i. As the image consists of multiple rows of pixel points and such memory generally stores the error accumulation values of the pixel points by row, this memory is called an error row memory. According to one embodiment of this invention, SRAM (Static Random Access Memory) is adopted as the error row memory.

In this case, when calculating the screen dots value and the error diffusion of a certain pixel point, after acquiring the gray level of the current pixel, add the error accumulation value of the pixel point in the last row at this point read from the error row memory, and then add the error diffusion of the pixel point preceding this pixel point in the current row with respect to this point, thereby obtaining the final gray level of this point. The screen dots of the current pixel can be generated by comparing the obtained final gray value with the threshold, and meanwhile, the error value the current pixel allocates to its surrounding points can also be obtained. In this invention, the error values of each pixel allocated to neighboring pixels according to the error diffusion algorithm, being also the preceding error diffusion, are called error allocation values.

Then, after obtaining the error allocation values of one pixel point to its surrounding points, these error allocation values need to be temporarily stored for a period of time to process the pixel points affected by the error diffusion of the pixel. According to this invention, register groups are used to temporarily store the error allocation values and are called error allocation register file.

Based on the same reason, as Jarvis algorithm will generate error diffusion to at most 2 points following the currently processed pixel and 10 pixel points in the next two rows during processing the current pixel, therefore, the error diffusion of this row to the next two rows needs to be stored. FIG. 1A illustrates the error diffusion of pixel point X to its surrounding pixels, wherein $D_1$, $D_2$, $D_3$ and $D_4$ represent error diffusion coefficients. In this case, the error allocation values of pixel point X to its surrounding pixels can be represented by $ED_1$, $ED_2$, $ED_3$, and $ED_4$, wherein E is the error that needs to be diffused. On the other hand, for any pixel point, it will be affected by at most 10 pixel points in the preceding 2 rows and the preceding 2 pixel points in the current row, as shown in FIG. 1C. It should be understood that such effects cannot be calculated at one time and is generated in batches with the processing of data in each row, and therefore, the error accumulation values generated in each batch need to be stored to generate the final gray value.

That is to say, for any pixel point $P_{i,j}$, first, after the point $P_{i-2,j+2}$ in row i-2 has been processed, the error diffusion of all the pixel points in row i-2 converged at pixel point $P_{i,j}$ can be calculated, thereby generating one error accumulation value of row i-2 at pixel point $P_{i,j}$, which is called an intermediate error accumulation value $L_{i,j}'$ and stored in the error row memory. Then, one error accumulation value of row i-1 at pixel point $P_{i,j}$ is generated after the pixel point $P_{i-1,j+2}$ in row i-1 has been processed, and read the intermediate error accumulation value $L_{i,j}'$ previously stored in the error row memory and add the error accumulation value generated by row i-1 at this pixel point to obtain a total error accumulation value of the last two rows (row i-1 and row i-2) at pixel point $P_{i,j}$, i.e. the final error accumulation value $L_{i,j}$.

As shown in FIG. 1D, after processing the $P_{i,j}$ point *, the final error accumulation value $L_{i+1,j-2}$ of rows i−1 and i to pixel point $P_{i+1,j-2}$ (@ as shown in FIG. 1D) and the intermediate error accumulation value $L_{i+2,j-2}'$ of row i to pixel point $P_{i+2,j-2}$ (@' as shown in FIG. 1D) are generated simultaneously. For convenience, they can be taken as a data packet and stored in the error row memory simultaneously. in this case, when calculating the final gray value of the pixel point $P_{i+1,j-2}$ (@), the final error accumulation value $L_{i+1,j-2}$ of the pixel point $P_{i+1,j-2}$ needs to be read from the error row memory and the intermediate error accumulation value $L_{i+2,j-2}'$ of pixel point $P_{i+2,j-2}$ (@') in the same data packet is also read from the memory simultaneously. However, the intermediate error accumulation value $L_{i+2,j-2}'$ can only be used for calculating the final error accumulation value after processing the error allocation value of row i+1 to $P_{i+2,j-2}$ (@'). Hence, it needs to be stored in register temporarily.

In order to temporarily store the intermediate error accumulation value that is read along with the final error accumulation value simultaneously to take part in the calculation of the newly generated final error accumulation value, a new register file also needs to be provided to store the read intermediate error accumulation value, which is called an error accumulation register file according to the present invention.

This invention provides a method and an apparatus which can process N (N≥2) neighboring pixel points in the same row and thereby generate multi-site FM screen dots based on error diffusion method simultaneously. FIG. 2 is a block diagram of the high speed FM screen dots generating apparatus (1) which processes multiple neighboring pixels simultaneously according to this invention. The high speed FM screen dots generating apparatus (1) includes an error row memory (2), an error allocation/accumulation register file (3), an error row memory control circuit (4), an error allocation/accumulation register file control circuit (5), and a screen dots generator (6). The functions of said parts will be described briefly hereinafter.

As described above, during processing a certain pixel $P_{i,j}$, the effect of surrounding pixels to it need to be accumulated. The effect of the surrounding pixels to pixel $P_{i,j}$ can be divided into two parts as follows: the error effect generated by the row preceding row i to pixel $P_{i,j}$, i.e. the final error accumulation value or the intermediate error accumulation value, and the error row memory (2) is used for storing such part of contents; and the error effect generated by the pixel points before the pixel $P_{i,j}$ in row i to pixel $P_{i,j}$, i.e. the sum of the error allocation values of the pixel points before the current pixel to pixel $P_{i,j}$ in row i, and the error allocation value of each preceding pixel point is stored in the error allocation/accumulation register file (3). The error allocation/accumulation register file (3) is also used for caching the intermediate processing values during pixel processing, such as the intermediate error accumulation values read from the error row memory (2) to be used.

The error row memory control circuit (4) connected with the error row memory (2) controls the input and the output of the error row memory (2). The error allocation/accumulation register file control circuit (5) connected with the error allocation/accumulation register file (3) controls the input and the output of the error allocation/accumulation register file (3).

Figure 3:
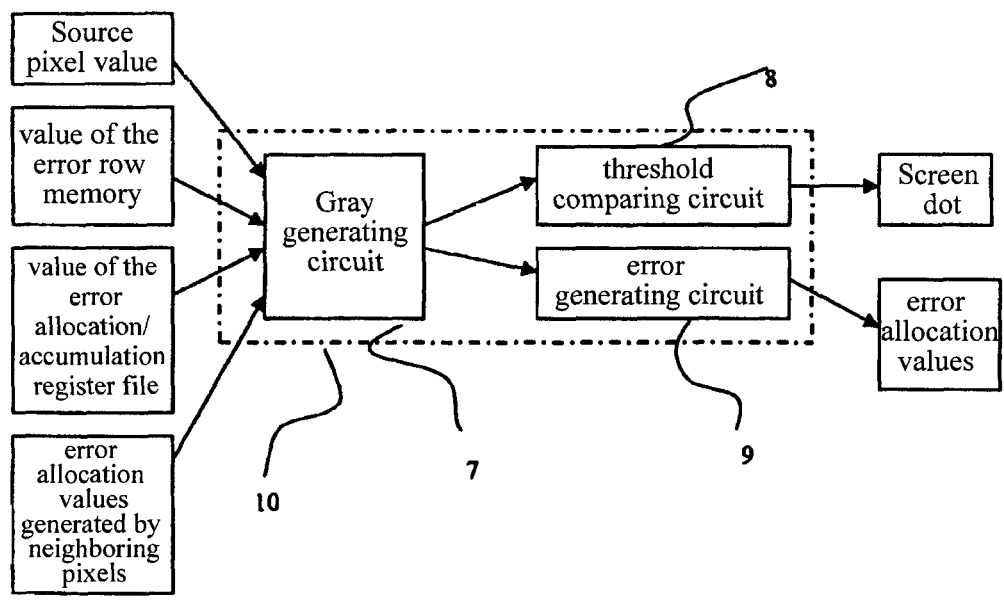
FIG. 3 is a block diagram of a screen dots generating circuit in the apparatus as shown in FIG. 2.

As shown in FIG. 2, the screen dots generator (6) consists of multiple screen dots generating circuits (10). FIG. 3 illustrates the screen dots generating circuit (10) according to this invention, including a gray generating circuit (7), a threshold comparing circuit (8), and an error generating circuit (9). Wherein, the inputs of the gray generating circuit (7) are the source pixel value of pixel $P_{i,j}$, the final error accumulation value in the error row memory corresponding to this pixel, and the error allocation values generated by the pixels before this pixel in the same row to this pixel, and the outputs of the screen dots generating circuit are the final screen dots and the error allocation value generated after processing this pixel. According to the apparatus of this invention, the number of the pixels it processes is the same with that the number of the groups of the screen dots generating circuits (10) it includes.

Figure 4:
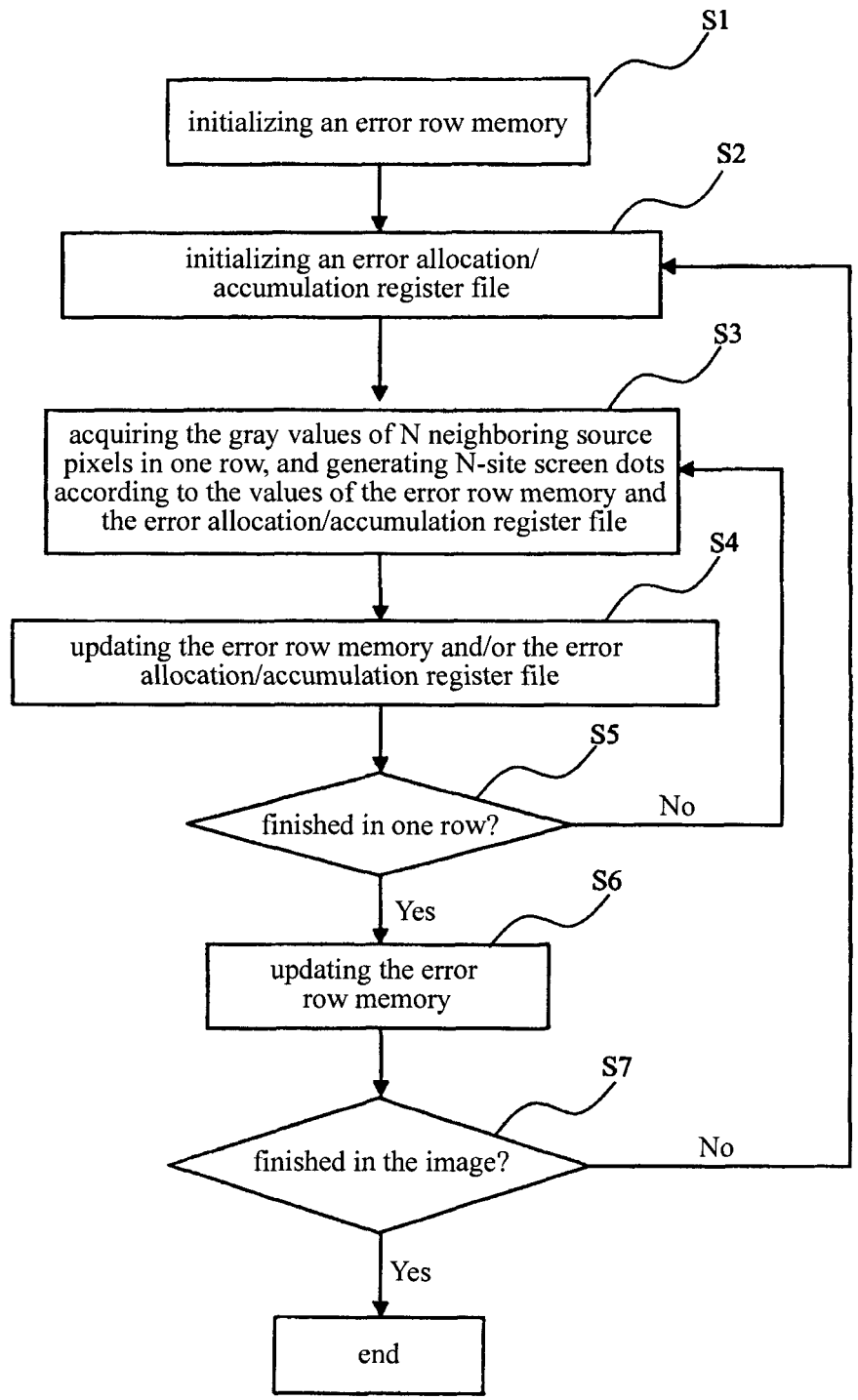
FIG. 4 is a flowchart of the high speed FM screen dots method which processes multiple neighboring pixels in the same row according to one embodiment of this invention.

FIG. 4 is a flowchart of the method that processes N neighboring pixels in the same row simultaneously according to this invention, including the following steps:

S1, initializing the error row memory;

S2, initializing the error allocation/accumulation register file;

S3, acquiring a group of N neighboring source pixels in each group row by row and group by group, and generating N-site screen dots according to the source pixel value of current N pixels and the values stored in the error row memory and the error allocation/accumulation register file;

S4, updating the error row memory and the error allocation/accumulation register file each time when the N neighboring pixels in one group are processed;

S5, determine whether the processing of one row is over, if not, turn to S3, while if yes, turn to S6;

S6, update the error row memory again;

S7, determine whether the image processing is over, if not, turn to S2, while if yes, the processing is over.

According to the method of this invention, multiple neighboring pixels in the same row can be processed simultaneously to generate multi-site screen dots. Also, the scanning in S3 can be in a 'S' shape, i.e. the source pixels in a row are processed from left to right while the source pixels in the next row are processed from right to left.

The First Embodiment

Based on Jarvis algorithm, taking generating two-site screen dots simultaneously as an example, the apparatus and the method according to this invention will be described in details hereinafter.

Figure 5:
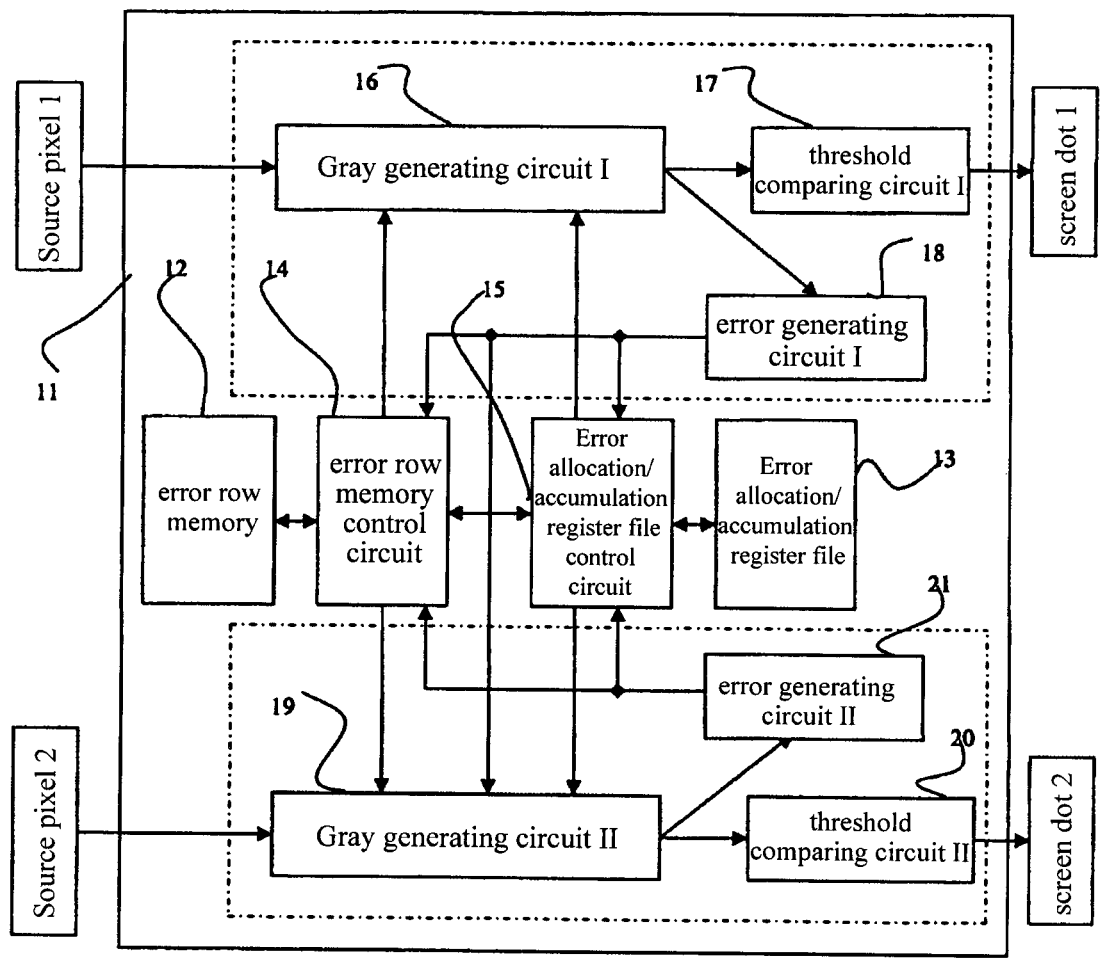
FIG. 5 is a block diagram of the high speed FM screen dots generating apparatus which processes two neighboring pixels in the same row based on Jarvis algorithm according to one embodiment of this invention.

FIG. 5 illustrates the high speed FM screen dots generating apparatus which is based on Jarvis algorithm and can process 2 neighboring pixels in the same row simultaneously according to this invention. As shown in FIG. 5, the apparatus (11) includes 10 parts of an error row memory (12), an error allocation/accumulation register file (13), an error row memory control circuit (14), an error allocation/accumulation register file control circuit (15), a gray generating circuit I (16), a threshold comparing circuit I (17), an error generating circuit I (18), a gray generating circuit II (19), a threshold comparing circuit II (20), and an error generating circuit II (21). The gray generating circuit I (16), the threshold comparing circuit I (17), and the error generating circuit I (18) in the apparatus constitute a first group of screen dots generating circuits (10); and the gray generating circuit II (19), the threshold comparing circuit II (20), and the error generating circuit II (21) constitute the second group of screen dots generating circuits (10).

Gray Generating Circuit

As shown in FIG. 5, the gray generating circuit I (16) is used to generate the final gray value of source pixel 1, and the input of the gray generating circuit I (16) is connected with the source pixel 1, the error row memory control circuit (14) and the error allocation/accumulation register file control circuit (15), and its output is supplied to the threshold comparing circuit I (17) and the error generating circuit I (18).

The gray generating circuit II (19) is used to generate the final gray value of source pixel 2, and the input of the gray generating circuit II is connected with the source pixel 2, the error row memory control circuit (14) and the error allocation/accumulation register file control circuit (15) as well as the error generating circuit I (18), and its output is supplied to the threshold comparing circuit II (20) and the error generating circuit II (21).

Figure 6A:
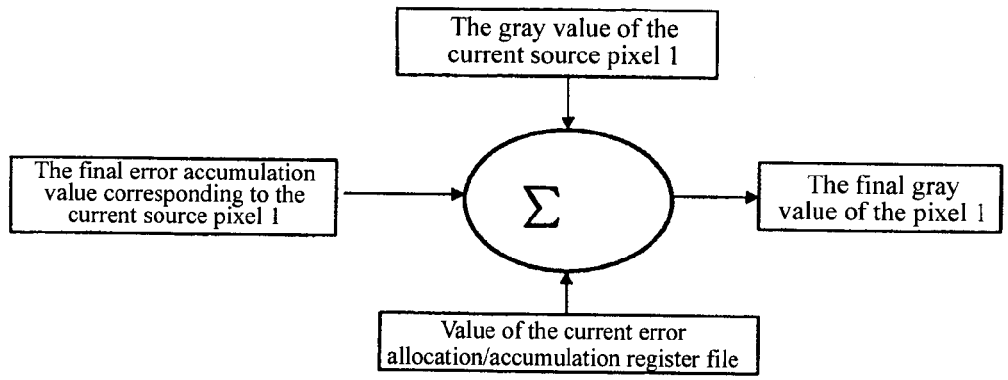
FIG. 6A is a principle diagram of the gray generating circuit I in the apparatus as shown in FIG. 2.

FIG. 6A illustrates the operating principle of the gray generating circuit I (16) according to this embodiment. As shown in this figure, the final gray value of pixel 1 is generated by adder. Wherein, the final gray value of pixel 1=the source pixel value of pixel 1+the final error accumulation value read from the error row memory (12) corresponding to the pixel 1+the error allocation values of the pixels before the pixel in the same row to pixel 1 cached in the error allocation register file (13).

Figure 6B:
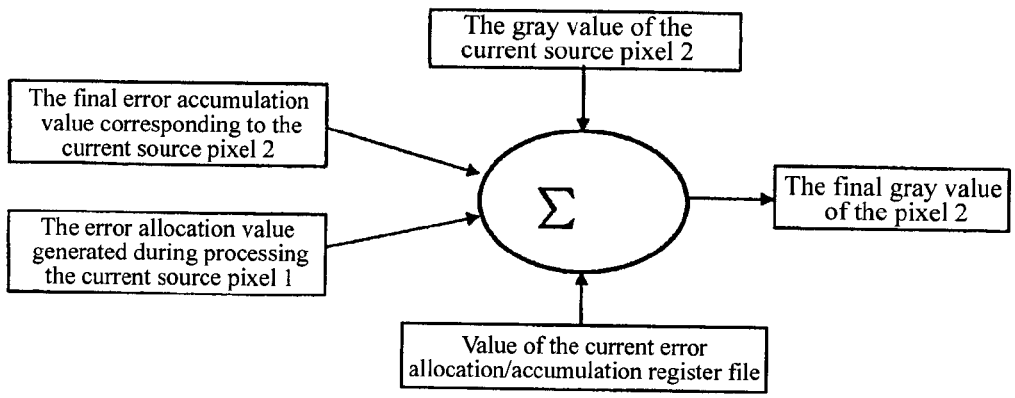
FIG. 6B is a principle diagram of the gray generating circuit II in the apparatus as shown in FIG. 2.

FIG. 6B illustrates the operating principle of the gray generating circuit II (19) according to this embodiment. As shown in this figure, the final gray value of pixel 2 is generated by adder. Wherein, the final gray value of pixel 2=the source pixel value of pixel 2+the final error accumulation value read from the error row memory (12) corresponding to the pixel 2+the error allocation values of the pixels before pixel 1 in the same row to pixel 2 cached in the error allocation register file (13)+the error allocation value generated by processing pixel 1 to the current pixel 2.

After obtaining the final gray value of the pixel, it is transported to the threshold comparing circuit to generate screen dots 1 and is simultaneously transported to the error generating circuit to obtain the error allocation value of this pixel to its surrounding points.

One of the reasons why the above apparatus can process 2 neighboring pixels simultaneously and generate 2-site screen dots is in that the close relationship between the two groups of screen dots generating circuit (10). As shown in FIG. 5 and FIG. 6B, the values allocated to pixel 2 among the error allocation values outputted by the error generating circuit I (18) of pixel 1 are directly input into the gray generating circuit II (19) of pixel 2, and it is unnecessary to be registered in the error allocation/accumulation register file (13).

Error Row Memory and the Control Circuit Thereof

The error row memory (12) is used to store the final error accumulation value and the intermediate error accumulation value, and is connected to the error row memory control circuit (14) and controlled by the same.

From Jarvis algorithm, the error of pixel can be diffused to relevant pixels in the next two rows of the pixel. Hence, the error row memory in this embodiment is configured to be 2 rows. Assuming the currently processed 2 neighboring pixels are $P_{i,5}$ and $P_{i,6}$, according to the solution of this invention, during processing the 2 neighboring pixels simultaneously, the final error accumulation values corresponding to $P_{i,5}$ and $P_{i,6}$, and the intermediate error accumulation values corresponding to the 2 neighboring locations (corresponding to pixels $P_{i+1,5}$ and $P_{i+1,6}$) over against the next row need to be read from the error row memory simultaneously. Therefore, the data in the error row memory is arranged in such a manner that the data corresponding to 4 locations, i.e. 2 neighboring locations in one row of the image and 2 neighboring locations over against next row, is taken as a unit, and is sequentially arranged in the unit of unit.

FIG. 7A is a schematic view of the error row memory with an image width of 8 pixels, wherein (i,j) represents the location of the pixel corresponding to the data stored in the error row memory.

FIG. 7B is a schematic view of part of the pixel points in certain three neighboring rows of the processed image, wherein $P_{i,j}$ refers to a pixel point in row i and in column j.

As shown in FIG. 7A, the first unit of the error row memory corresponds to the final error accumulation values of the first pixel $P_{i,1}$ and the second pixel $P_{i,2}$ in row i of the source image and to the intermediate error accumulation values of the first pixel $P_{i+1,1}$ and the second pixel $P_{i+1,2}$ in row i+1 of the source image; the second unit of the error row memory corresponds to the final error accumulation values of the third pixel $P_{i,3}$ and the fourth pixel $P_{i,4}$ in row i of the source image and to the intermediate error accumulation values of the third pixel $P_{i+1,3}$ and the fourth pixel $P_{i+1,4}$ in row i+1 of the source image; and the like, the last unit of the error row memory corresponds to the final error accumulation values of the seventh pixel $P_{i,7}$ and the eighth pixel $P_{i,8}$ in row i of the source image and to the intermediate error accumulation values of the seventh pixel $P_{i+1,7}$ and the eighth pixel $P_{i+1,8}$ in row i+1 of the source image.

The bus width of the error row memory requires that data at 4 locations in 1 unit of the error row memory be able to be read/written in one time. Assuming the data width at the location corresponding to one pixel in the error row memory is 8 bits, and then the bus width of the error row memory should be 4*8=32 bits.

The read and write process of the error row memory will be described hereinafter.

From Jarvis algorithm, the intermediate error accumulation value of one pixel point in row i is decided by 5 neighboring pixels in row i−2, and the final error accumulation value is jointly decided by 5 neighboring pixels in row i−1 and 5 neighboring pixels in row i−2. Likewise, the intermediate error accumulation values of two neighboring pixel points in row i are decided by 6 neighboring pixels in row i−2, and the final error accumulation values are jointly decided by 6 neighboring pixels in row i−1 and 6 neighboring pixels in row i−2. Therefore, referring to the above description taken in conjunction with FIG. 1D, after processing the $P_{i,j}$, the final error accumulation value of point $P_{i+1,j-2}$ and the intermediate error accumulation value of point $P_{i+2,j-2}$ can be determined simultaneously and are stored simultaneously in one unit of the error row memory as a data packet. Likewise, after processing the two neighboring pixel points $P_{i,j}$ and $P_{i,j+1}$ simultaneously, the final error accumulation values of $P_{i+1,j-2}$ and $P_{i+1,j-2}$ and the intermediate error accumulation values of points $P_{i+2,j-2}$ and $P_{i+2,j-1}$ can be determined simultaneously and are stored simultaneously in one unit of the error row memory as a data packet. Just based on this principle, this invention performs data updating of the error row memory.

FIG. 8 is an illustrative schematic view of the read and write process of the error row memory according to the embodiment. Description will be made hereinafter taking the embodiment as shown in FIG. 7B and FIG. 8 as an example. Taking the pixel as shown in FIG. 7B as an example, before starting to process the pixels in row i, what is stored in the error row memory is the final error accumulation values of the pixels in row i and the intermediate error accumulation values of the pixels in row i+1. When pixels $P_{i,1}$ and $P_{i,2}$ start to be processed, the final error accumulation values $L_{i,1}$ and $L_{i,2}$ of pixels $P_{i,1}$ and $P_{i,2}$ and the intermediate error accumulation values $L_{i+1,1}'$ and $L_{i+1,2}'$ of pixels $P_{i+1,1}$ and $P_{i+1,2}$ are read in one time from the first unit of the error row memory. Wherein $L_{i,1}$ and $L_{i,2}$ are respectively used to generate the final grays of pixels $P_{i,1}$ and $P_{i,2}$ and will not be used after generating the final screen dots; while $L_{i+1,1}'$ and $L_{i+1,2}'$ are cached in the error accumulation register file and are used later to generate the final error accumulation values $L_{i+1,1}$ and $L_{i+1,2}$ corresponding to the locations. Pixels $P_{i,3}$ and $P_{i,4}$ will be processed after pixels $P_{i,1}$ and $P_{i,2}$ have been processed. At this time, the final error accumulation values of pixels $P_{i,3}$ and $P_{i,4}$ and the intermediate error accumulation values of pixels $P_{i+1,3}$ and $P_{i+1,4}$ are read from the second unit of the error row memory. Likewise, the final error accumulation values are used for generating the final screen dots of pixels $P_{i,3}$ and $P_{i,4}$, and the intermediate error accumulation values are cached in the error accumulation register file. When pixels $P_{i,3}$ and $P_{i,4}$ have been processed, the error allocation values of pixels $P_{i,3}$ and $P_{i,4}$ are rendered, and then the final error accumulation values and the intermediate error accumulation values of the 4 pixels in the dashed line block a in FIG. 7B can be determined and are stored in the first unit of the error row memory as renewed data, and also, the contents at such locations in the error row memory will not be modified during the pixel processing after row i. Then, pixels $P_{i,5}$ and $P_{i,6}$ will be processed. Likewise, when pixels $P_{i,5}$ and $P_{i,6}$ have been processed, the final error accumulation values and the intermediate error accumulation values of the 4 pixels in the dashed line block b can be determined and then are stored in the second unit of the error row memory as renewed data. Please note that when the last two pixels $P_{i,7}$ and $P_{i,8}$ in row i have been processed, not only the final error accumulation values and the intermediate error accumulation values of the 4 pixels in the dashed line block c, but also the final error accumulation values and the intermediate error accumulation values of the 4 pixels in the dashed line block d can be determined. Hence, two read and write operations need to be conducted on the error row memory to conduct data updating twice. The calculation method for the renewed data in the error memory will be described hereinafter via examples. Suppose the currently processed pixels are $P_{i,5}$ and $P_{i,6}$, the error allocation values after processing the pixels $P_{i,5}$ and $P_{i,6}$ are respectively represented by $E_{i,5}D_1$, $E_{i,5}D_2$, $E_{i,5}D_3$, $E_{i,5}D_4$, and $E_{i,6}D_1$, $E_{i,6}D_2$, $E_{i,6}D_3$, and $E_{i,6}D_4$, and then the calculation method for the final error accumulation values and the intermediate error accumulation values $L_{i+1,3}$, $L_{i+1,4}$, $L_{i+2,3}'$, and $L_{i+2,4}'$ of the 4 pixels in the dashed line block b are described as follows: $L_{i+1,3}=L_{i+1,3}'+E_{i,1}D_2+E_{i,2}D_3+E_{i,3}D_4'E_{i,4}D_3+E_{i,5}D_2$, $L_{i+1,4}=L_{i+1,4}'+E_{i,2}D_2+E_{i,3}D_3+E_{i,4}D_4+E_{i,5}D_3+E_{i,6}D_2$, $L_{i+2,3}'=E_{i,1}D_1+E_{i,2}D_2+E_{i,3}D_3+E_{i,4}D_2+E_{i,5}D_1$, and $L_{i+2,4}'=E_{i,2}D_1+E_{i,3}D_2+E_{i,4}D_3+E_{i,5}D_2+E_{i,6}D_1$, wherein $L_{i+1,3}'$, and $L_{i+1,4}'$ are respectively the intermediate error accumulation values of the pixels in row i-1 to pixels $P_{1+1,3}$ and $P_{i+1,4}$.

Generally speaking, as the final error accumulation values in the error row memory corresponding to the processed pixels in the current row will not be used after the final screen dots of the pixels have been generated, and the intermediate error accumulation values are stored in the error accumulation register file, in the unit that is written in the error row memory, the first two locations are the final error accumulation values corresponding to the two neighboring pixels in the next row of the currently processed row, and the following two locations are the intermediate error accumulation values corresponding to the two neighboring pixels in the next two rows of the currently processed row. Thus, two rows of the error row memory can be used repeatedly, and the initial value of the error row memory is set 0.

Meanwhile, besides the error allocation values of the currently processed pixels (taking $P_{i,5}$ and $P_{i,6}$ as examples), other relevant values (i.e. the error allocation values of pixels $P_{i,1}, P_{i,2}, P_{i,3}$ and $P_{i,4}$, and the intermediate error accumulation values $L_{i+1,3}'$ and $L_{i+1,4}'$) affecting $L_{i+1,3}$, $L_{i+1,4}$, $L_{i+2,3}'$, and $L_{i+2,4}'$ are stored in the error allocation/accumulation register file, so the calculation and the writing of the $L_{i+1,3}$, $L_{i+1,4}$, $L_{i+2,3}'$, and $L_{i+2,4}'$ can be completed without reading the error row memory again. As the bus width of the error row memory in this invention is at least the data width at 4 locations in the error row memory, only one reading operation on the memory is needed in reading the 4 values $L_{i,5}, L_{i,6}, L_{i+1,5}'$, and $L_{i+1,6}'$ (respectively corresponding to the $P_{i,5}, P_{i,6}, P_{i+1,5}$, and $P_{i+1,6}$ in FIG. 7B) in one unit, and also only one writing operation on the memory is needed in writing the 4 values $L_{i+1,3}, L_{i+1,4}, L_{i+2,3}'$, and $L_{i+2,4}'$ (corresponding to the pixels in dashed line block b in FIG. 7B) in another unit. Thus, during processing 2 neighboring pixels $P_{i,5}$ and $P_{i,6}$ using the apparatus according to this invention, only one reading operation on the memory is needed to read $L_{i,5}, L_{i,6}, L_{i+1,5}'$, and $L_{i+1,6}'$ and only one writing operation on the memory to write $L_{i+1,3}, L_{i+1,4}, L_{i+2,3}'$, and $L_{i+2,4}'$, thereby greatly improving the screen dots generating speed.

Figures 9, 10:
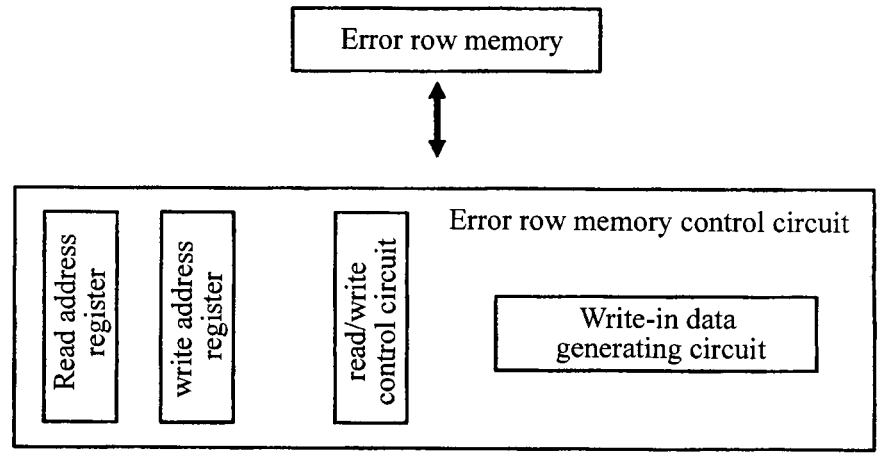
FIG. 9 is a block diagram of the error row memory control circuit in the apparatus as shown in FIG. 2.
FIG. 10 is a schematic view of the structure of the error allocation/accumulation register file in the apparatus as shown in FIG. 2.

FIG. 9 is a block diagram of the error row control circuit (14) in the apparatus according to this invention, including a read address register, a write address register, a read/write control circuit, and a write-in data generating circuit. Wherein, the contents stored in the read address register and the write address register are generated by the coordinate of the first pixel (suppose it is $P_{i,5}$) in the currently processed two pixels; the write-in data generating circuit consists of adders and renders the data written into the error row memory in one time according to the error allocation values generated by processing the current two neighboring pixels $P_{i,5}$ and $P_{i,6}$, the error allocation values (stored in the error allocation register file) generated by the pixels before pixels $P_{i,5}$ and $P_{i,6}$ in the same row, and relevant intermediate error accumulation values (stored in the error accumulation register file); and the read/write control circuit generates the read/write control signal of the error row memory.

The determination of the read address or the write address stored in the read address register and the write address register will be described hereinafter via examples. As an illustrative example, set the read address as 2*j−1, and the write address as 2*(j−2)−1, wherein j is the column number of the first pixel among the currently processed pixels, j=1, 2, ... n. The above mentioned addresses are byte address. If the column number of the first pixel $P_{i,5}$ among the currently processed pixels is j=5, the read address is 2*5−1=9, and read data $L_{i,5}, L_{i,6}, L_{i+1,5}'$, and $L_{i+1,6}'$ in one time at 4 consecutive locations in one unit starting from the current read address. Correspondingly, the write address is 2*(5−2)−1=5, and after the write-in data generating circuit generates the write-in data $L_{i+1,3}, L_{i+1,4}, L_{i+2,3}'$, and $L_{i+2,4}'$ (whose calculation method has been described in the preceding text) corresponding to 2 neighboring locations in the next row of the current row and in the next two rows of the current row respectively, and write in one time the above write-in data into 4 consecutive locations in one unit starting from the current write address.

Error Allocation/Accumulation Register File and the Control Circuit Thereof

The error allocation/accumulation register file (13) consists of hardware triggers, for caching error allocation values and intermediate error accumulation values, and it is connected to the error allocation/accumulation register file control circuit (15) and controlled by the same.

FIG. 10 is a schematic view of the error allocation/accumulation register file according to this embodiment, including all the error allocation values of 4 neighboring pixels before the currently processed pixel in the same row and the intermediate error accumulation values as read of two pixels in the next row of the currently processed row.

From the preceding description, during calculating the final error accumulation values and the intermediate error accumulation values in the method according to this invention so as to renew the error row memory, the error allocation values of at most 6 neighboring pixels in the current row are needed, so the error allocation register file needs to store all the error allocation values of 4 neighboring pixels before the currently processed pixel in the same row which together with the error allocation values generated by the currently processed 2 neighboring pixels are used to renew in the error row memory the final error accumulation values and the intermediate error accumulation values of the corresponding pixels in the next row and in the next two rows of the currently processed row, that is, to renew the values at 4 locations in a unit before the unit corresponding to the currently processed pixels in the error row memory. From Jarvis algorithm, it can be easily rendered that the final error values of the next row of the current row are relevant to the original values in the error row memory, and the error values of the second row after the current row are 0 before the processing of the current row is started, so the error accumulation register file only needs to store 2 intermediate error accumulation values of the next row of the current row.

In this embodiment, as shown in FIG. 10, the error allocation/accumulation register file (13) is a register file that can cache all the error allocation values of 4 neighboring pixels and 2 intermediate error accumulation values of the next row of the currently processed row, wherein suppose $P_{i,5}$ and $P_{i,6}$ are two currently processed neighboring pixels, $E_{i,m}D_n$ (m=1 ... 4, n=1 ... 4) represents all the error allocation values of 4 neighboring pixels $P_{i,1}$-$P_{i,4}$ before $P_{i,5}$ and $P_{i,6}$ in the same row, and $L_{i+1,3}'$ and $L_{i+1,4}'$ represent the intermediate error accumulation values as read during processing the pixels $P_{i,3}$ and $P_{i,4}$.

Figure 11:
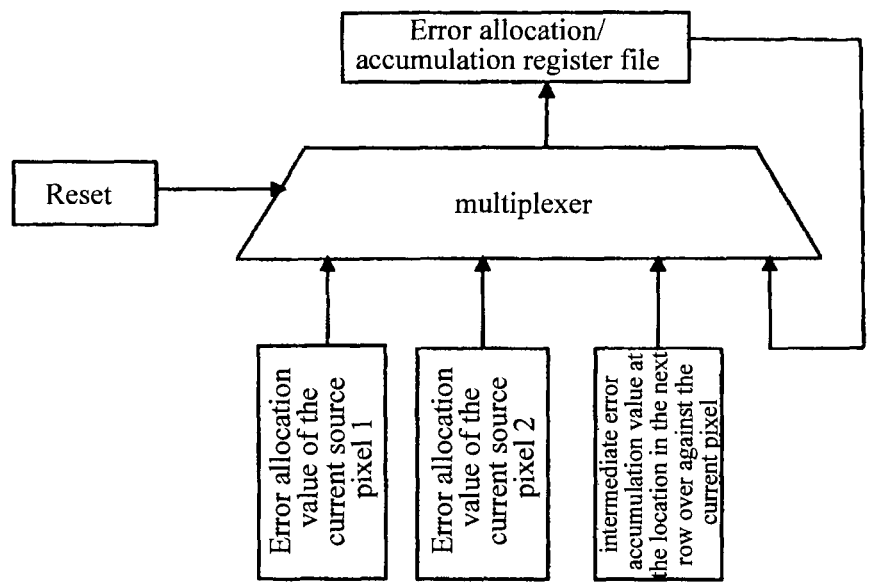
FIG. 11 is a schematic view of the operating principle of the multiplexer in the error allocation/accumulation register file control circuit in the apparatus as shown in FIG. 2.

FIG. 11 is a schematic view of the working principle of the multiplexer in the error allocation/accumulation register file control circuit in the apparatus according to this invention. The error allocation/accumulation register file control circuit renews the error allocation/accumulation register file once in each processing period via n multiplexers, and conducts initialization and reset before processing each row, wherein n is the number of the registers in the error allocation/accumulation register file, that is, each register in the error allocation/accumulation register file includes one multiplexer with the same structure, and in this embodiment, n=18. Wherein, the inputs of the multiplexer include all the error allocation values of the currently processed pixels, the intermediate error accumulation values as read during processing the current pixels, and the original values of the error allocation/accumulation register file, and the outputs of the multiplexer are the renewed values of the registers in the error allocation/accumulation register file.

Data updating of the error allocation/accumulation register file will be described hereinafter in conjunction with the method according to this invention.

Figure 12:
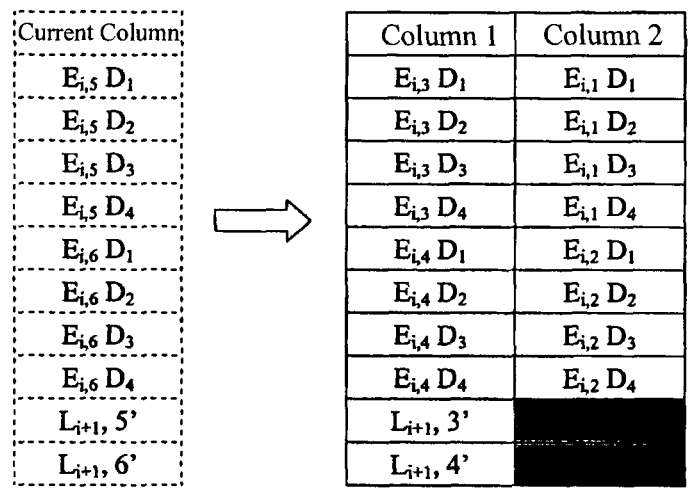
FIG. 12 is a schematic view of the process of updating the data in the error allocation/accumulation register file in the apparatus as shown in FIG. 2.

FIG. 12 is a schematic view of the process of updating the data in the error allocation/accumulation register file according to this embodiment, wherein $E_{i,j}D_n$ (n=1 ... 4) represents the error allocation value of pixel j in row i. Taking the currently processed pixels $P_{i,5}$ and $P_{i,6}$ as examples, after rendering the error allocation values $E_{i,5}D_n$ and $E_{i,6}D_n$ of two current neighboring pixels and the intermediate error accumulation values $L_{i+1,5}'$ and $L_{i+1,6}'$ as read of the next row of the current row, corresponding to $E_{i,3}D_n$ and $E_{i,4}D_n$ (in column 2 as shown in FIG. 12), the multiplexer respectively outputs $E_{i,5}D_n$ and $E_{i,6}D_n$ (in the current column in FIG. 12); corresponding to $L_{i+1,3}'$ and $L_{i+1,4}'$, the multiplexer respectively outputs $L_{i+1,5}'$ and $L_{i+1,6}'$; and corresponding to $E_{i,1}D_n$ and $E_{i,2}D_n$ (in column 1 as shown in FIG. 12), the multiplexer respectively outputs $E_{i,3}D_n$ and $E_{i,4}D_n$ (in column 2 in FIG. 12). In the view of metaphor, columns in the error allocation/accumulation register file are renewed in a manner of being advanced forward sequentially.

Screen Dots Generating Method

In this embodiment, suppose 2 currently processed pixels are $P_{i,5}$ and $P_{i,6}$, and then the method for generating multi-site FM screen dots includes the following steps:

1) acquire 2 neighboring source pixels in row i, i.e. $P_{i,5}$ and $P_{i,6}$;

2) read the error accumulation values at 4 locations in one unit in one time from the error row memory, i.e. the final error accumulation values $L_{i,5}$ and $L_{i,6}$ corresponding to pixels $P_{i,5}$ and $P_{i,6}$, and the intermediate error accumulation values $L_{i+1,5}'$ and $L_{i+1,6}'$ corresponding to pixels $P_{i+1,5}$ and $P_{i+1,6}$;

3) for the first pixel $P_{i,5}$ among the currently processed pixels, from the contents of the error allocation/accumulation register file, calculate $S_1$, which is the sum of the error allocation values rendered by the errors allocating to pixel $P_{i,5}$ generated by all preceding processing of the pixels in the same row, and $S_1=E_{i,3}D_3+E_{i,4}D_4$; then calculate the final gray of pixel $P_{i,5}$, and the final gray of pixel $P_{i,5}$=source pixel value 1+$L_{i,5}$+$S_1$; compare the final gray value with the threshold to generate the final screen dots 1 of the pixel $P_{i,5}$, calculate the error allocation values of pixel $P_{i,5}$ to its surrounding pixel points, and transport the error allocation value $Ei,5D_4$ of pixel $P_{i,5}$ to the second pixel point $P_{i,6}$;

Meanwhile, for the second pixel $P_{i,6}$ among the currently processed pixels, calculate $S_2$, which is the sum of the error allocation values rendered by allocating the errors to pixel $P_{i,6}$ generated by all preceding processing of the pixels in the same row, and $S_2=E_{i,4}D_3+E_{i,5}D_4$; then calculate the final gray of pixel $P_{i,6}$, and the final gray of pixel $P_{i,6}$=source pixel value 2+$L_{i,6}$+$S_2$; compare the final gray value with the threshold to generate the final screen dots 2 of the pixel $P_{i,6}$, and calculate the error allocation values of pixel $P_{i,6}$ to its surrounding pixel points; and 4) conduct data updating of the error row memory and the error allocation/accumulation register file, i.e. calculate the final error accumulation values $L_{i+1,3}$ and $L_{i+1,4}$ and the intermediate error accumulation values $L_{i+2,3}'$ and $L_{i+2,4}'$ according to the error allocation values of pixels $P_{i,1}$~$P_{i,6}$ and the intermediate error accumulation values $L_{i+1,3}'$ and $L_{i+1,4}'$ stored in the error allocation/accumulation register file, and write the calculation results into the error row memory, to realize the data updating of the error row memory; and Store the intermediate error accumulation values $L_{i+1,5}'$ and $L_{i+1,6}'$ as read in step 2 and the error allocation values of pixels $P_{i,5}$ and $P_{i,6}$ as obtained in step 3 into the error allocation/accumulation register file, and renew the error allocation/accumulation register file in a manner of being advanced forward sequentially.

In view of the specific implementation apparatus according to this embodiment, the threshold comparing circuit I (17) is used to compare the gray generated by the gray generating circuit (16) with the threshold to generate screen dots 1; the threshold comparing circuit II (20) is used to compare the gray generated by the gray generating circuit II (19) with the threshold to generate screen dots 2; the error generating circuit I (19) is used to generate the error allocation value of the current pixel 1 from the gray generated by the gray generating circuit I (16) via calculation or table look-up, and output the results to the error row memory control circuit (14), the error allocation/accumulation register file control circuit (15), and the gray generating circuit II (19); the error generating circuit II (21) is used to generate the error allocation value of the current pixel 2 from the gray generated by the gray generating circuit II (19) via calculation or table look-up, and output the results to the error row memory control circuit (14) and the error allocation/accumulation register file control circuit (15), to conduct the data updating of the error row memory (12) and the error allocation/accumulation register file (13).

The Second Embodiment

If there is a need to generate N-site screen dots simultaneously, the apparatus constitution is similar to 2-site screen dots, and as shown in FIG. 2, the difference lies in that during realization, the screen dots generator (6) consists of N groups of screen dots generating circuits (10). During realization, N neighboring source pixels in the same row are acquired in one time; generate N-site screen dots according to the current N source pixel values and the data stored in the error row memory (2) and the error allocation/accumulation register file (3). It should be understood by one skilled in the art that the bus width of the error row memory and the capacity of the error allocation/accumulation register file need to be further increased, to meet the demand of reading and storing data in one time. Suppose the number of the current pixels that are processed simultaneously is N, the data width at one location in the error row memory is W, and the number of the rows that the error of one pixel can be diffused to is H (including the current row), the minimum bus width of the error row memory is N×W×(H−1). The capacity of the error allocation/accumulation register file depends on the maximum number of the neighboring pixels to which the error from processing one pixel will be diffused in the adopted error diffusion algorithm.

Specifically, the method for generating N-site screen dots according to the gray values of the current N pixels and the values of the error row memory and the error allocation/accumulation register file includes the following steps:

1) the N groups of screen dots generating circuits simultaneously acquire the gray values of N neighboring source pixels in row i, and read in one time from the error row memory the final error accumulation values corresponding to the current N neighboring pixels in row i and the intermediate error accumulation values of N neighboring pixels at the immediate corresponding locations in row i+1; and 2) as for the first pixel $P_{i,j}$ (j refers to the column number) among the currently processed N neighboring source pixels, render $S_1$, which is the sum of the error values rendered by allocating to this pixel all the errors generated by processing all preceding pixels in the same row, according to the data stored in the error allocation register file;

The first group of screen dots generating circuits adds $S_1$ onto the final error accumulation value $L_{i,j}$ corresponding to the first pixel $P_{i,j}$ among the currently processed pixels, which is then added onto the gray value of the first source pixel acquired in step 1) to obtain the first final pixel gray value which is then compared with the threshold to generate the first final screen dots, and calculate the error allocation values of pixel $P_{i,j}$ to its surrounding pixel points;

At the same time, for the second pixel $P_{i,j+1}$ among the currently processed pixels, render the sum of the error allocation values rendered by allocating to this pixel all the errors generated by all the pixels before pixel $P_{i,j}$ in the same row, according to the data stored in the error allocation register file, and then render $S_2$ as a total sum by adding the sum onto the error allocation values rendered by allocating to pixel $P_{i,j+1}$ the error generated by processing the first pixel $P_{i,j}$;

The second group of screen dots generating circuits adds $S_2$ onto the final error accumulation value $L_{i,j+1}$ corresponding to the second pixel $P_{i,j+1}$ among the currently processed pixels, which is then added onto the gray value of the second source pixel to obtain the second final pixel gray value which is then compared with the threshold to generate the second final screen dots, and calculate the error allocation values of pixel $P_{i,j+1}$ to its surrounding pixel points; and Likewise, for the $M^{th}$ pixel $P_{i,j+M-1}$ (2<M≤N) among the currently processed pixels, render $S'_M$, which is the sum of the error allocation values rendered by allocating to the $M^{th}$ pixel all the errors generated by all the pixels before pixel $P_{i,j}$ in the same row, according to the data stored in the error allocation register file, and then render $S''_M$, which is the sum of all the error allocation values rendered by allocating to the $M^{th}$ pixel all the errors generated by the first pixel to the $M-1^{th}$ pixel, and add $S'_M$ onto $S''_M$ to render $S_M$, which is the total sum of the error allocation values rendered by allocating to the $M^{th}$ pixel all the errors generated by all the pixels before the $M^{th}$ pixel in the same row;

After processing the current N neighboring pixels, the method for includes the following steps:

1) render the values $E_{i,K}D_n$ generated by allocating to all the neighboring pixels the errors generated by the current N neighboring pixels according to the final pixel gray values of each of the currently processed pixels and the threshold, and $E_{i,K}D_n$ refers to a group of error allocation values generated by the $K^{th}$ pixel among the currently processed pixels, 1≤K≤N; for Jarvis algorithm, n=1 . . . 4;

2) according to the contents in the error allocation/accumulation register file and the error allocation values generated by processing the current N neighboring pixels, render the final error accumulation values at N neighboring locations $P_{i+1,j-N}$~$P_{i+1,j-1}$ in row i+1 and the intermediate error accumulation values at N neighboring locations $P_{i+2,j-N}$~$P_{i+2,j-1}$ in row i+2, which are written into corresponding locations in the error row memory in one time;

3) arrange all the error allocation values of each N neighboring pixels in the error allocation register file in one column, renew the error allocation values of a preceding column of N neighboring pixels to be those of the following column of N neighboring pixels, and renew the error allocation values of the last column of N neighboring pixels to be those of the current N neighboring pixels; and 4) renew the intermediate error accumulation values of the original N neighboring pixels $P_{i+1,j-N}$~$P_{i+1,j-1}$ to be those of the N neighboring pixels $P_{i+1,j}$~$P_{i+i,j+N-1}$ at the locations in the next row corresponding to the current N neighboring pixels.

Described above are only preferred embodiments of this invention and shall not be construed as limitations on the same. It should be understood that various parts in the above described apparatus and the connecting relationships there between are illustrative and one skilled in the art could make various modifications and replacements without departing from the spirit of this invention. In addition, the above method is only a preferred solution of this invention, and proper selections and optimizations can be made by one skilled in the art to the steps of the method according to specific circumstances. For example, in the above method for updating data in the error row memory, a updating method for the error row memory during processing the first and the last pixels in any row of image is introduced, i.e. the error row memory will not be renewed during processing the first two pixels in each row (as now renewed data is generated), and will be renewed twice during processing the last two pixels in each row. While one skilled in the art understands that there exists many other data updating methods. For example, one unit in the forefront of the error row memory can be left and is refreshed during processing the first two pixels in each row, and effective final error accumulation values and intermediate error accumulation values will be stored from the second unit of the error row memory. Also for example, the error row memory can be refreshed once after processing the last two pixels in each row, then further process the two blank dots after each row, and refresh the last unit of the error row memory.

In addition, although the embodiments of the apparatus for generating 2-site screen dots simultaneously in one time according to this invention are described in conjunction with the Jarvis algorithm in which errors are diffused to 12 neighboring locations, this invention can also be applied to other error diffusion algorithms and the apparatus which simultaneously generates more than 2 screen dots. Hence, any modifications, equivalent replacements, improvements, etc. within the spirit and the principle of this invention should be contained within the scope of protection of this invention.

The invention claimed is:

1. A method for generating multi-site FM screen dots simultaneously, including the following steps:

initializing an error row memory, which is configured to store a final error accumulation value and an intermediate error accumulation value of pixel points;

initializing an error allocation/accumulation register file, which is configured to store an error allocation value;

acquiring original gray values of a group of N neighboring pixels row by row, and generating N-site screen dots simultaneously according to the original gray values, the values stored in the error row memory and the error allocation/accumulation register file, wherein N≥2; and updating the values in the error row memory and the error allocation/accumulation register file when the N neighboring pixels in the group are processed.

2. The method according to claim 1, wherein the error allocation/accumulation register file includes an error allocation register file and an error accumulation register file, wherein the error allocation register file is configured to store error allocation values of pixels in a current row that are used in follow-up error processing, and the error accumulation register file is configured to cache the intermediate error accumulation values of pixel points read from the error row memory.

3. The method according to claim 2, wherein updating values in the error allocation/accumulation register file includes the following steps:

taking error allocation values of each N neighboring pixels in the error allocation register file as a column, updating the error allocation values of a preceding column of N neighboring pixels to be the error allocation values of a following column of N neighboring pixels, and updating the error allocation values of a last column of N neighboring pixels to be the error allocation values of a current N neighboring pixels;

updating the intermediate error accumulation values of N neighboring pixels $P_{i+1j-N}\sim P_{i+1j-1}$ in the error accumulation register file to be the intermediate error accumulation values of N neighboring pixels $P_{i+1j-N}\sim P_{i+1j-1}$ in a next row corresponding to the current N neighboring pixels.

4. The method according to claim 1, wherein generating N-site screen dots simultaneously according to the original gray values, the values stored in the error row memory and the error allocation/accumulation register file includes:

reading N final error accumulation values corresponding to the N neighboring pixels from the error row memory; and acquiring N total error allocation values by the error allocation/accumulation register file, wherein the N total error allocation values are produced by allocating errors resulting from pixels processed before current N neighboring pixels in the same row to the current N neighboring pixels;

sequentially calculating final gray values of the current N neighboring pixels according to the original gray values, the N final error accumulation values, and the N total error allocation values to generate N-site screen dots and calculate the error allocation values of the current N neighboring pixels with respect to surrounding pixels;

wherein, after any one of the current N neighboring pixels is processed, the error allocation values generated with respect to the subsequent other pixel points in the current N neighboring pixels by the one of the current N neighboring pixels are used for calculating final gray values of the subsequent other pixel points.

5. The method according to claim 4, wherein the error allocation/accumulation register file is configured to store intermediate error accumulation values and updating values in the error row memory includes the following steps:

after the N neighboring pixels $P_{ij}\sim P_{ij+N-1}$ in a current row have been processed, obtaining error accumulation values of N neighboring pixels $P_{i+1j-N}\sim P_{i+1j-1}$ in a row next to the current row and intermediate error accumulation values of N neighboring pixels $P_{i+2j-N}\sim P_{i+2j-1}$ in two rows next to the current row according to the intermediate error accumulation values stored in the error allocation/accumulation register file and the error allocation values of the processed pixels in the current row.

6. The method according to claim 4, wherein the original gray values of the N neighboring pixels are obtained by scanning from left to right for odd number rows and from right to left for even number rows, or from right to left for odd number rows and from left to right for even number rows.

7. The method according to claim 1, further comprising reading intermediate error accumulation values of N neighboring pixels in a next row aligned with the N neighboring pixels while reading the N error accumulation values corresponding to the N neighboring pixels from the error row memory.

8. The method according to claim 1, wherein the error allocation/accumulation register file is configured to store intermediate error accumulation values and updating values in the error row memory includes the following steps:

after the N neighboring pixels $P_{ij}\sim P_{ij+N-1}$ in a current row have been processed, obtaining error accumulation values of N neighboring pixels $P_{i+1j-N}\sim P_{i+1j-1}$ in a row next to the current row and intermediate error accumulation values of N neighboring pixels $P_{i+2j-N}\sim P_{i+2j-1}$ in two rows next to the current row according to the intermediate error accumulation values stored in the error allocation/accumulation register file and the error allocation values of the processed pixels in the current row.

9. The method according to claim 1, wherein the original gray values of the pixels are obtained by scanning from left to right for odd number rows and from right to left for even number rows, or from right to left for odd number rows and from left to right for even number rows.

10. The method according to claim 1, wherein a bus width of the error row memory is $N*W*(H-1)$, wherein N refers to the number of pixels currently processed simultaneously; W refers to data width at one position in the error row memory; and H refers to the number of the rows which an error of one pixel can diffuse to include the row where the currently processed pixels are located.

11. An apparatus for generating multi-site FM screen dots simultaneously, including:
- an error row memory and an error row memory control circuit connected therewith;
- an error allocation/accumulation register file and an error allocation/accumulation register file control circuit connected therewith;
- a plurality of screen dots generating circuit, each of which includes a gray generating circuit and a threshold comparing circuit and an error generating circuit respectively connected to an output end of the gray generating circuit, and is configured to generate screen dots of a pixel and an error allocation value of this pixel with respect to surrounding pixels;
- wherein an output end of the error generating circuit in each of said screen dots generating circuits is connected with an input end of the gray generating circuit in the screen dots generating circuits, and is connected with input ends of the error row memory control circuit and the error allocation/accumulation register file control circuit;
- wherein output ends of the error row memory control circuit and the error allocation/accumulation register file control circuit are connected to an input end of the gray generating circuit in each of the screen dots generating circuits.

12. The apparatus according to claim 11, wherein the error allocation/accumulation register file is achieved by a register array including triggers, and includes an error allocation register file and an error accumulation register file, and the error allocation register file is configured to store error allocation values of pixels, and the error accumulation register file is configured to cache intermediate error accumulation values of pixel points read from the error row memory.

13. The apparatus according to claim 11, wherein the error row memory control circuit includes a read address register, a write address register, a read/write control circuit, and a write-in data generating circuit.

14. The apparatus according to claim 13, wherein the error row memory control circuit is configured to generate the read/write address.

15. The apparatus according to claim 11, wherein the error allocation/accumulation register file control circuit includes a plurality of multiplexers for generating a control signal for the error allocation/accumulation register file to update and initialize data of the error allocation/accumulation register file.

* * * * *

UNITED STATES PATENT AND TRADEMARK OFFICE
CERTIFICATE OF CORRECTION

PATENT NO. : 8,699,080 B2  
APPLICATION NO. : 12/441252  
DATED : April 15, 2014  
INVENTOR(S) : Chen et al.

Page 1 of 1

It is certified that error appears in the above-identified patent and that said Letters Patent is hereby corrected as shown below:

On the Title Page, after Item [65], the "Prior Publication Data", and before Item [51], the "Int. Cl." data, insert item --[30]      Foreign Application Priority Data
  Sep. 15, 2006    (CN) ........................ 200610113131.6--.

In the Claims

Claim 3, column 15, lines 51-52,
"values of a current N neighboring pixels;" should read
--values of current N neighboring pixels;--.

Claim 11, column 17, line 8,
"a plurality of screen dots generating circuit," should read
--a plurality of screen dots generating circuits,--.

Signed and Sealed this
Seventh Day of October, 2014

Michelle K. Lee
*Deputy Director of the United States Patent and Trademark Office*